(12) United States Patent
Arendt et al.

(10) Patent No.: US 10,403,913 B2
(45) Date of Patent: Sep. 3, 2019

(54) FUEL CELL DEVICE HAVING A WATER-TRANSFERRING ANODE GAS PATH, AND METHOD FOR OPERATING A FUEL CELL

(71) Applicant: Volkswagen AG, Wolfsburg (DE)

(72) Inventors: Martin Arendt, Hamburg (DE); Harald Heinrich, Braunschweig (DE)

(73) Assignee: Audi AG, Ingolstadt (DE)

( * ) Notice: Subject to any disclaimer, the term of this patent is extended or adjusted under 35 U.S.C. 154(b) by 160 days.

(21) Appl. No.: 15/322,386

(22) PCT Filed: Jun. 18, 2015

(86) PCT No.: PCT/EP2015/063773
§ 371 (c)(1),
(2) Date: Dec. 27, 2016

(87) PCT Pub. No.: WO2016/000978
PCT Pub. Date: Jan. 7, 2016

(65) Prior Publication Data
US 2017/0155159 A1   Jun. 1, 2017

(30) Foreign Application Priority Data

Jul. 2, 2014   (DE) ........................ 10 2014 212 835

(51) Int. Cl.
*H01M 8/04119*   (2016.01)
*H01M 8/04828*   (2016.01)
*H01M 8/1018*   (2016.01)

(52) U.S. Cl.
CPC ... *H01M 8/04141* (2013.01); *H01M 8/04164* (2013.01); *H01M 8/04828* (2013.01); *H01M 2008/1095* (2013.01)

(58) Field of Classification Search
CPC ......... H01M 8/04141; H01M 8/04828; H01M 8/04164; H01M 2008/1095
See application file for complete search history.

(56) References Cited

U.S. PATENT DOCUMENTS

| 9,252,438 | B2 | 2/2016 | Baur et al. | |
| 2005/0147862 | A1 | 7/2005 | Knoop et al. | |
| 2007/0003809 | A1 | 1/2007 | Luo et al. | |
| 2009/0075130 | A1 | 3/2009 | Knoop et al. | |
| 2010/0035100 | A1* | 2/2010 | Hornburg | H01M 8/04007 429/439 |
| 2010/0143813 | A1* | 6/2010 | Goebel | H01M 8/04223 429/429 |

(Continued)

FOREIGN PATENT DOCUMENTS

| CN | 102437357 | 5/2012 |
| DE | 10155217 | 5/2003 |

(Continued)

*Primary Examiner* — Lisa S Park
(74) *Attorney, Agent, or Firm* — Davidson, Davidson & Kappel, LLC

(57) ABSTRACT

A fuel cell device (1) including an anode-gas path (3) and a method for operating a fuel cell device (1). In order to wet an anode of the fuel cell device (1) in a simple manner, an anode-gas drainage section (13) of the fuel cell device (1) is connected to an anode-gas supply section (7) of the fuel cell device (1) in a water-conducting manner and water is added to an anode-gas that is carried to the fuel cell (2).

10 Claims, 2 Drawing Sheets

(56) References Cited

U.S. PATENT DOCUMENTS

| | | | | |
|---|---|---|---|---|
| 2011/0165479 A1* | 7/2011 | Gunther | ............ | H01M 8/04014 |
| | | | | 429/414 |
| 2012/0156579 A1* | 6/2012 | Yabutani | ........... | H01M 8/04373 |
| | | | | 429/423 |
| 2013/0137004 A1 | 5/2013 | Dehn et al. | | |
| 2014/0329156 A1 | 11/2014 | Mathie et al. | | |

FOREIGN PATENT DOCUMENTS

| | | |
|---|---|---|
| DE | 102007061959 | 6/2009 |
| DE | 102010024187 | 12/2011 |
| DE | 10 2011 114 719 A1 | 4/2013 |
| DE | 102011116856 | 4/2013 |
| DE | 102014105995 | 11/2014 |
| WO | WO2013/020647 | 2/2013 |

\* cited by examiner

FUEL CELL DEVICE HAVING A WATER-TRANSFERRING ANODE GAS PATH, AND METHOD FOR OPERATING A FUEL CELL The present invention relates to a fuel cell device, including a fuel cell and an anode gas path, which has an anode gas inflow section and an anode gas outflow section and extends through the fuel cell on the anode side between the anode gas inflow section and the anode gas outflow section, and which includes a recirculation section, which connects the anode gas outflow section to the anode gas inflow section in an anode gas-conductive manner. The present invention furthermore relates to a method for operating a fuel cell device including a fuel cell.

BACKGROUND

Fuel cell devices and methods for operating fuel cell devices are generally known. For example, DE 10 2011 114 719 A1 discloses a fuel cell of this type.

When operating the fuel cell and, in particular, during the startup thereof, it must be taken into consideration that the anode has a predefined moisture. During a hot start of the fuel cell, in particular, in which the fuel cell is restarted, for example, shortly after being taken out of operation, it is possible, however, that the anode dries out, due to the high operating temperature of the fuel cell, and the operation of the fuel cell device may no longer be safely ensured.

BACKGROUND

It is an object of the present invention to provide a fuel cell device and a method for operating a fuel cell device, where it is possible to easily supply moisture to an anode of the fuel cell.

For the fuel cell device mentioned at the outset, the present invention provides that the anode gas outflow section is connected to the recirculation section in such a way that liquid product water is transferred to the fuel cell. For the method mentioned at the outset, the object is achieved in that water is added to an anode gas conducted to the fuel cell and is removed from the anode exhaust gas of the fuel cell in the form of liquid product water.

Due to these simple measures, it is ensured that the water content of the anode is unable to drop below a predefined setpoint value, since the water missing from the anode may be supplied together with the anode gas. The recirculation section is often used to resupply operating gas still contained in the anode exhaust gas, for example hydrogen, to the fuel cell. To further reduce the effort of wetting the anode, the recirculation section preferably connects the anode gas outflow section to the anode gas inflow section in a water-conducting manner. As a result, the product water may be removed from the fuel cell on the anode side and be supplied to the anode together with the anode gas to be conducted back to the fuel cell. The removed product water may be at least partially added to the anode gas conducted to the fuel cell and be conducted from the anode gas to the anode for the wetting thereof. Due to the fact that the water is supplied to the anode gas in the anode gas inflow section, the fuel cell does not need to be structurally modified.

The approach according to the present invention may be further improved by different embodiments, which are each advantageous per se and, unless otherwise indicated, may be arbitrarily combined with each other. These specific embodiments and the advantages associated therewith are discussed below.

Thus, the anode gas inflow section may be connected to the recirculation section in such a way that water vapor is received therefrom. If the anode has too little moisture, it may be easily wetted by using product water of the fuel cell. The product water is discharged through the anode outflow section during the operation of the fuel cell and may be at least partially used to wet the anode. Adding water from an external source is thus unnecessary. Product water of the fuel cell may thus be added to the anode gas, in particular when it flows through the anode gas inflow section.

The recirculation section may include an anode gas compressor to be able to ensure that a predefined pressure difference drops between an anode gas input and an anode exhaust gas outlet of the fuel cell. Anode exhaust gas is supplied to the anode gas compressor on the inlet side. The anode gas compressor is gas-conductively connected to the anode gas inflow section on the outlet side. Water, in particular product water, is furthermore suppliable to the anode exhaust gas compressor on the inlet side. The product water may be supplied to the anode exhaust gas compressor together with the anode exhaust gas, so that additional lines are not required. The product water is preferably discharged from the fuel cell together with the anode exhaust gas, so that the fuel cell does not have to be structurally modified. The anode gas compressor not only transports the water to the anode gas inflow section, but the water is vaporized before being added to the anode gas conducted to the fuel cell, it being possible to induce the vaporization, in particular, via the anode exhaust gas compressor. Heat, namely, arises during the compression of the anode exhaust gas, with the aid of which the water may be vaporized.

The fuel cell device may include a water separator, through which the anode gas outflow section between the fuel cell and the recirculation section extends. As a result, the product water generated by the fuel cell may be optionally separated or supplied to the anode gas inflow section.

The water separator is preferably designed to specify the quantity of water supplied to the anode gas inflow section. As a result, the quantity of moisture to be supplied to the anode may be set by the water separator. For this purpose, the water separator may include a valve, for example a stop valve or a control valve, through which the product water is optionally conductible away from the fuel cell or to the anode gas inflow section or to the recirculation section.

Particularly during a hot start of the fuel cell, in which the fuel cell is restarted, for example shortly after being taken out of operation, the anode may be efficiently wetted with the aid of the fuel cell device according to the present invention or the method according to the present invention without the complexity of the fuel cell device or the method for operating the fuel cell increasing.

BRIEF DESCRIPTION OF THE DRAWINGS

The present invention is explained below in exemplary embodiments on the basis of the associated drawings.

DETAILED DESCRIPTION

The present invention is explained below by way of example on the basis of specific embodiments with reference to the drawings. The different features of the specific embodiments may be combined independently of each other, as has already been described in relation to the individual advantageous embodiments.

The structure and function of a fuel cell device according to the present invention is first described with reference to the exemplary embodiment in FIG. 1.

Figure 1:
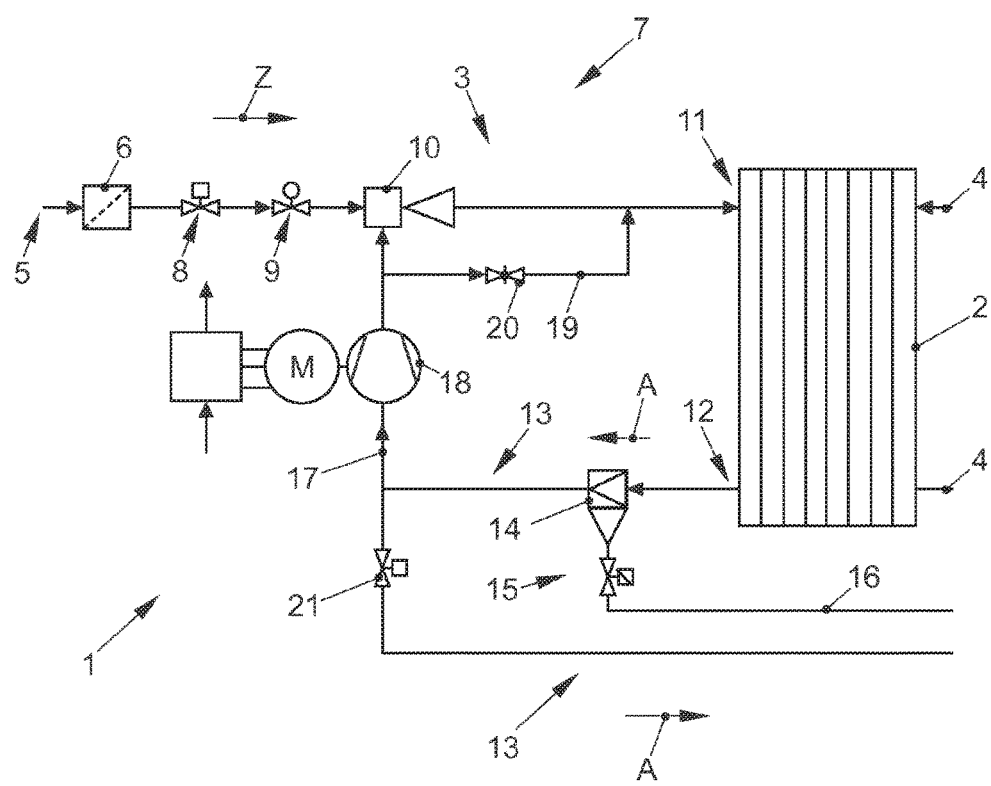
FIG. 1 shows a schematic representation of one exemplary embodiment of the fuel cell device according to the present invention.

FIG. 1 shows a schematic view of fuel cell device 1, including a fuel cell 2, an anode gas path 3 and a section of a cathode gas path 4. Anode gas path 3 extends through fuel cell 2 on the anode side and cathode gas path 4 extends through the fuel cell on the cathode side.

Anode gas path 3 includes an inlet 5, through which the anode gas, for example hydrogen, may flow to fuel cell 2. Inlet 5 is designed, for example, as an inlet of an anode gas filter 6. In an inflow direction Z, the anode gas may flow through anode gas path 3 from inlet 5 in the direction of fuel cell 2. In inflow direction Z downstream from inlet 5, an anode gas inflow section 7 extends between inlet 5 and fuel cell 2. During the operation of fuel cell device 1, anode gas flows through anode gas inflow section 7 to the fuel cell, where it reacts with cathode gas.

For example, anode gas inflow section 7 first extends through at least one and, for example two, shutoff valves 8, 9, which are connected to each other in series. A pump 10 is shown downstream from shutoff valves 8, 9, through which anode gas inflow section 7 extends, and with the aid of which the anode gas may be conveyed to fuel cell 2. The anode gas may be conducted from pump 10 directly to an anode gas inlet 11 of fuel cell 2. After the anode gas has flowed through fuel cell 2, it exits from fuel cell 2 again through an anode gas outlet 12. The anode exhaust gas which had flowed through anode gas outlet 12 flows away from fuel cell 2 through an anode gas outflow section 13 of anode gas path 3.

In outflow direction A, downstream from anode outlet 12, anode gas outflow section 13 extends through a water separator 14, with the aid of which product water of fuel cell 2 may be separated from the anode exhaust gas. The separated product water may be discharged through a stop valve 15 of water separator 14 and a waste water line 16. The anode exhaust gas may furthermore be removed through anode gas outflow section 13 and be conducted, for example, to the surroundings or to other units of fuel cell device 1.

To be able to resupply operating gas still contained in the anode gas, for example hydrogen, to fuel cell 2, anode gas path includes a recirculation section 17, which connects anode gas outflow section 13 to anode gas inflow section 7 in an anode exhaust gas-conducting manner. In particular, recirculation section 17 connects anode gas inflow section 7 to anode gas outflow section 13 in an anode exhaust gas-receiving manner. Recirculation section 17 may pass through a compressor 18. The anode exhaust gas has a lower pressure on the inlet side of compressor 18 than on the outlet side. In particular, the anode exhaust gas pressure on the outlet side of the compressor essentially corresponds to the pressure of the anode gas in anode gas inlet section 7. On the outlet side of compressor 18, recirculation section 17 may conduct the anode exhaust gas to pump 10, to which compressor 18 may be gas-conductively connected. Pump 10 is, for example, a jet pump, in which the pump action is generated by the anode gas flowing from inlet 5 to fuel cell 2. The anode exhaust gas may be easily conveyed with the aid of pump 10 and be mixed with the anode gas conducted through inlet 5.

Recirculation section 17 may include a bypass section 19, which is able to connect compressor 18 to anode gas inflow section 7 on the outlet side of pump 10. Bypass section 19 may extend through a valve 20, for example a check valve, which opens, for example, when the pressure between compressor 18 and valve 20 is greater than a predefined maximum pressure. When the gas pressure decreases again, valve 20 may close automatically or even in a self-acting manner.

To be able to conduct the anode exhaust gas to anode gas inflow section 7, anode gas outflow section 13 may extend through another valve 21, for example a stop valve. Recirculation section 17 preferably branches off from anode gas outflow section 13 between water separator 14 and valve 21. If valve 21 is at least partially or even completely closed, the anode exhaust gas may flow in the direction of anode gas inflow section 7. If valve 21 is open, the anode exhaust gas may at least partially or even completely flow out through anode gas outflow section 13.

If stop valve 15 is at least partially or even completely closed, the product water may be incompletely conducted from water separator 14 to waste water line 16 or not at all. As a result, the product water may flow at least in sections through anode gas outflow section 13. If valve 21 is also at least partially or even completely closed, the product water may not flow out through anode gas outflow section 13. Instead the product water is conducted through recirculation section 17 in the direction of anode gas inflow section 7. Anode gas inflow section 7 may conduct the product water to anode gas inlet 11. Fuel cell device 1 may be designed in such a way that the product water is conveyed to anode gas inlet section 7, to recirculation path 17 or to compressor 18 by the force of gravity. The anode may be wetted in the fuel cell with the aid of the product water if the anode is about to dry out during the operation of fuel cell 2 or during a startup of fuel cell 2.

If the product water is supplied to the fuel cell in a liquid state, the providable amount of electrical power may be decreased thereby. As a result, it is advantageous to vaporize the product water before it is supplied to fuel cell 2 and, in particular, to anode gas inflow section 7. For example, the product water may be vaporized in compressor 18. Namely, if compressor 18 compresses the anode exhaust gas, the temperature thereof rises. If the product water is conducted to compressor 18, it may be vaporized without any additional devices for vaporizing the product water.

Figure 2:
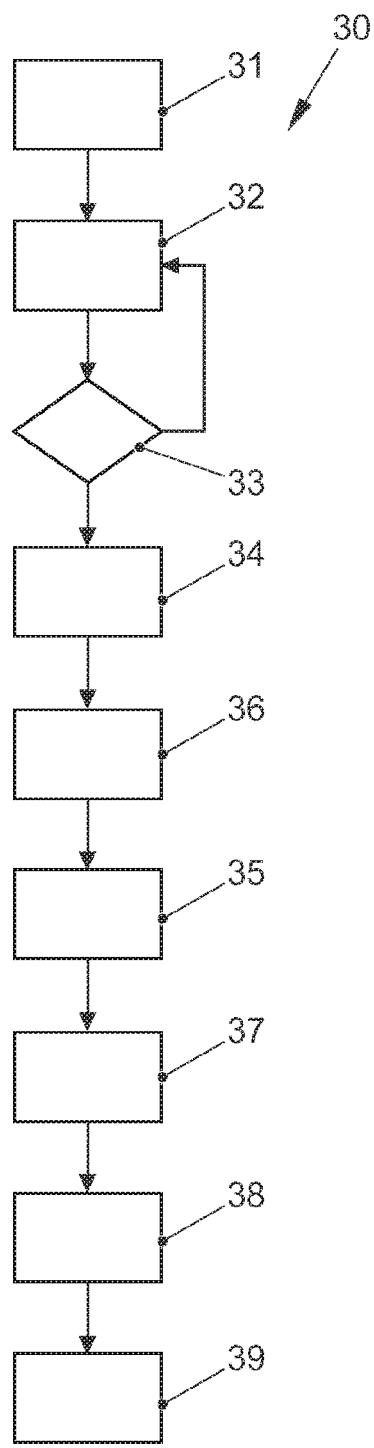
FIG. 2 shows a schematic representation of one exemplary embodiment of the method according to the present invention.

FIG. 2 shows a method according to the present invention for operating a fuel cell device 1, schematically in the form of a flow chart. The same reference numerals are used for elements of fuel cell device 1, which are mentioned below.

Method 30 for operating fuel cell device 1 begins with a first method step 31. For example, fuel cell device 1 is placed into operation or started in method step 31. The moisture of the anode of fuel cell 2 may be ascertained directly or indirectly in a subsequent method step 32. For example, the temperature of fuel cell 2 or the anode and the moisture of the anode gas supplied to fuel cell 2 may be determined and the moisture of the anode ascertained thereby.

In method step 33 which now follows, it is decided whether the anode is to be wetted. If the water content of the anode is sufficient, method step 33 may be followed by method step 32, in which the moisture of the anode is determined. If the anode is to be wetted because it is about to dry out or is already too dry, method step 33 is followed by method step 34. Water for wetting the anode is provided in method step 34. In particular, product water discharged from fuel cell 2, which may be discharged, for example through anode gas outlet 12, may be provided for this purpose.

If the water for wetting the anode is supplied thereto in vaporized form, it may be vaporized in method step 35 following method step 34. To vaporize the water, the latter may be supplied to compressor 18 after it is provided. Optional method step 36, in which the water is supplied to the compressor, is carried out between method steps 34 and 35.

After method step 34 or method step 35, the water is supplied to anode gas inflow section 7 in method step 37. In method step 38, which now follows, the liquid or vaporous water is conducted together with the anode gas to fuel cell 2 and, in particular, to its anode, where it may be absorbed by the anode. The water content of the anode gas supplied to fuel cell 2 is preferably high enough to be able to sufficiently wet the anode, and it is preferably too low to condense in fuel cell 2.

Method 30 ends in method step 39. For example, the moisture of the anode may be redetermined, or fuel cell device 1 may be taken out of operation.

LIST OF REFERENCE NUMERALS 1 fuel cell device
2 fuel cell
3 anode gas path
4 cathode gas path
5 inlet of the anode gas path
6 anode gas filter
7 anode gas inflow section
8, 9 shutoff valve
10 pump
11 anode gas inlet of the fuel cell
12 anode gas outlet of the fuel cell
13 anode gas outflow section
14 water separator
15 stop valve
16 waste water line
17 recirculation section of the anode gas path
18 compressor
19 bypass section
20, 21 valve
30 method
31 start
32 Determine the moisture of the anode
33 Wet anode?
34 Provide water
35 Vaporize water
36 Supply water to the compressor
37 Conduct water to the anode gas inflow section
38 Conduct water to the anode
39 End
A outflow direction
Z inflow direction

What is claimed is:

1. A fuel cell device comprising:
    a fuel cell; and
    an anode gas path having an anode gas inflow section and an anode gas outflow section and extending through the fuel cell on an anode side between the anode gas inflow section and the anode gas outflow section, and including a recirculation section connecting the anode gas outflow section to the anode gas inflow section in an anode gas-conducting manner, the anode gas outflow section being connected to the recirculation section in such a way that product water is transferred to the fuel cell; the recirculation section including a compressor compressing the anode exhaust gas and vaporizing the product water from a liquid state.

2. The fuel cell device as recited in claim 1 wherein the anode gas inflow section is connected to the recirculation section in such a way that water vapor is received therefrom.

3. The fuel cell device as recited in claim 1 further comprising a water separator for separating water from the anode gas outflow section.

4. The fuel cell device as recited in claim 3 wherein the water separator is designed to specify a quantity of the product water supplied to the anode gas inflow section.

5. The fuel cell device as recited in claim 3 wherein the liquid product water is conveyed from the water separator to the compressor by force of gravity.

6. The fuel cell device as recited in claim 3 wherein the water separator connects to a waste water line with a stop valve.

7. A fuel cell device comprising:
    a fuel cell; and
    an anode gas path having an anode gas inflow section and an anode gas outflow section and extending through the fuel cell on an anode side between the anode gas inflow section and the anode gas outflow section, and including a recirculation section connecting the anode gas outflow section to the anode gas inflow section in an anode gas-conducting manner, the anode gas outflow section being connected to the recirculation section in such a way that liquid product water together with the anode gas from the anode gas outflow section is transferred to the anode gas inflow section by gravity and then to the fuel cell.

8. The fuel cell device as recited in claim 1 further comprising a water separator for separating water from the anode gas outflow section.

9. The fuel cell device as recited in claim 8 wherein the water separator is designed to specify a quantity of the product water supplied to the anode gas inflow section.

10. The fuel cell device as recited in claim 8 wherein the water separator connects to a waste water line with a stop valve.

* * * * *